United States Patent

Fong

(12) 
(10) Patent No.: US 6,709,262 B2
(45) Date of Patent: Mar. 23, 2004

(54) NOZZLE CAP

(75) Inventor: Gary Fong, Markham (CA)

(73) Assignee: Stackteck Systems Canada Inc. (CA)

( * ) Notice: Subject to any disclaimer, the term of this patent is extended or adjusted under 35 U.S.C. 154(b) by 15 days.

(21) Appl. No.: 10/104,982

(22) Filed: Mar. 22, 2002

(65) Prior Publication Data

US 2003/0180412 A1 Sep. 25, 2003

(51) Int. Cl.[7] ............................................. B29C 45/20
(52) U.S. Cl. ................................. 425/549; 264/328.15
(58) Field of Search ................................. 264/328.15

(56) References Cited

U.S. PATENT DOCUMENTS 5,208,052 A * 5/1993 Schmidt et al. ............ 425/549
6,309,208 B1 * 10/2001 Kazmer et al. ............. 425/562
6,394,785 B1 * 5/2002 Ciccone ..................... 425/549

* cited by examiner

Primary Examiner—Tim Heitbrink
(74) Attorney, Agent, or Firm—Harness, Dickey & Pierce, P.L.C.

(57) ABSTRACT

According to the present invention, a nozzle cap is provided which has a housing end that threadedly engages the nozzle housing to secure the nozzle tip to the nozzle housing. The remainder of the cap substantially fills the space between the nozzle tip and the gate insert while maintaining a small clearance between the cap and both the nozzle tip and the gate insert in the region surrounding an outlet end of the nozzle. The clearance prevents direct conductive heat transfer from the outlet end of the nozzle tip to the gate insert yet is sufficiently small enough to substantially eliminate melt to flow past it.

9 Claims, 4 Drawing Sheets

NOZZLE CAP

FIELD OF THE INVENTION

This invention relates generally to the injection moulding of plastics utilizing hot runner systems. More particularly this invention relates to injection moulding nozzle tip assemblies and the configuration of such assemblies to minimize colour bleeding when changing from one coloured resin to another.

BACKGROUND OF THE INVENTION

A conventional hot runner system for the injection moulding of plastics utilizes an injection nozzle or an array of such nozzles to force or "inject" molten resin ("melt") into a void defined between core and cavity parts of a mould. Each nozzle is made up of a nozzle body or housing and a nozzle tip secured to a "tip end" of the housing either by threaded engagement or by a "nozzle cap". A conventional nozzle cap is a ring which fits over the nozzle tip, engages a flange at the base of the nozzle tip and threadedly engages the tip end of the nozzle housing. The housing has a first run of a melt passage extending axially along its length through which melt passes. The tip has a second run of the melt passage which registers with the first run and provides a continuous melt passage through the nozzle tip assembly. The second run terminates in one or more outlets through the tip depending on the flow pattern required for the mould arrangement being used.

The nozzle tip, or at least an outer end thereof may be received in a "gate" insert". The gate insert forms the "gate" portion of the mould, which is that portion through which melt enters the mould.

The resin must be maintained in its molten state as melt until the mould is filled. As the gate insert and its surrounding mould part represent a large heat sink, preferably direct contact between the nozzle tip, which is of metal, and the gate insert should be avoided. One way to avoid such direct contact is to provide a "gap" or "void" between the outer end of the nozzle tip and the gate insert.

Initially the gate would be filled with air but later would fill with resin which seeps in during moulding. A disadvantage to such an arrangement occurs during changeover from resin of a first colour to resin of another colour. The trapped resin continues to "bleed" into the new resin producing unacceptable streaking and requiring a lengthy changeover period and many wasted parts before changeover is fully established.

One solution to the problem of bleeding is to fill the void between the gate insert and the nozzle tip with an insert sometimes called a "gate well insulator". The gate well insulator is a machined insert of an insulating material, such as a ceramic, which occupies the void in which resin would otherwise collect. This approach however has its own disadvantages which include, an expensive base material, difficulty in matching the insulator to the gate inserts and the tips, cracking of the insulators after a short period of use and sticking of the insulators in the gate insert when the mould is opened for cleaning.

SUMMARY OF THE INVENTION

According to the present invention, a nozzle cap is provided which has a housing end that threadedly engages the nozzle housing to secure the nozzle tip to the nozzle housing. The remainder of the cap substantially fills the space between the nozzle tip and the gate insert while maintaining a small clearance between the cap and both the nozzle tip and the gate insert in the region surrounding an outlet end of the nozzle. The clearance prevents direct conductive heat transfer from the outlet end of the nozzle tip to the gate insert yet is sufficiently small enough to substantially prevent melt to flow past it.

More particularly, a nozzle cap is provided for securing an injection moulding nozzle tip to a nozzle housing which is receivable in a gate insert. The nozzle cap has a body mountable over the nozzle tip. The body has a housing end for threadedly engaging the nozzle housing to secure a base of the nozzle tip in the housing. The body further has a tip end extending about an outlet end of the nozzle tip and having a passage therethrough registering with the nozzle tip to pass melt flow from the nozzle tip. The tip end is dimensioned to provide a first clearance between the outlet of the nozzle tip and an interior of the body sufficient to provide heat insulation while substantially preventing melt flow therebetween. The tip end further is dimensioned to provide a second clearance between the tip end and the gate insert sufficient to provide heat insulation while substantially preventing melt flow therebetween. The housing has a medial portion between the housing end and the tip end which is dimensioned to contact the gate insert.

The first clearance is preferably no greater than 0.005 inches and the second clearance is preferably no greater than 0.015 inches.

More preferably the first clearance is 0.005 inches and the second clearance is 0.010 inches.

An outer face of the nozzle cap may be provided with inter-engagement contours adjacent the tip end for engaging solidified resin between the nozzle cap and the gate insert to assist in holding the solidified resin to the nozzle cap during separation of the nozzle cap from the gate insert during mould cleaning. The inter-engagement contours may be grooves extending into the outer face.

The nozzle cap may be made of metal, which may be H13 steel with a wear and corrosion resistant surface. The wear and corrosion resistant surface may be provided by chromium plating, nickel plating or ion nitriding.

DESCRIPTION OF DRAWINGS

Preferred embodiments of the present invention are described below with reference to the accompanying illustrations in which.

DESCRIPTION OF PREFERRED EMBODIMENTS

Figure 1:
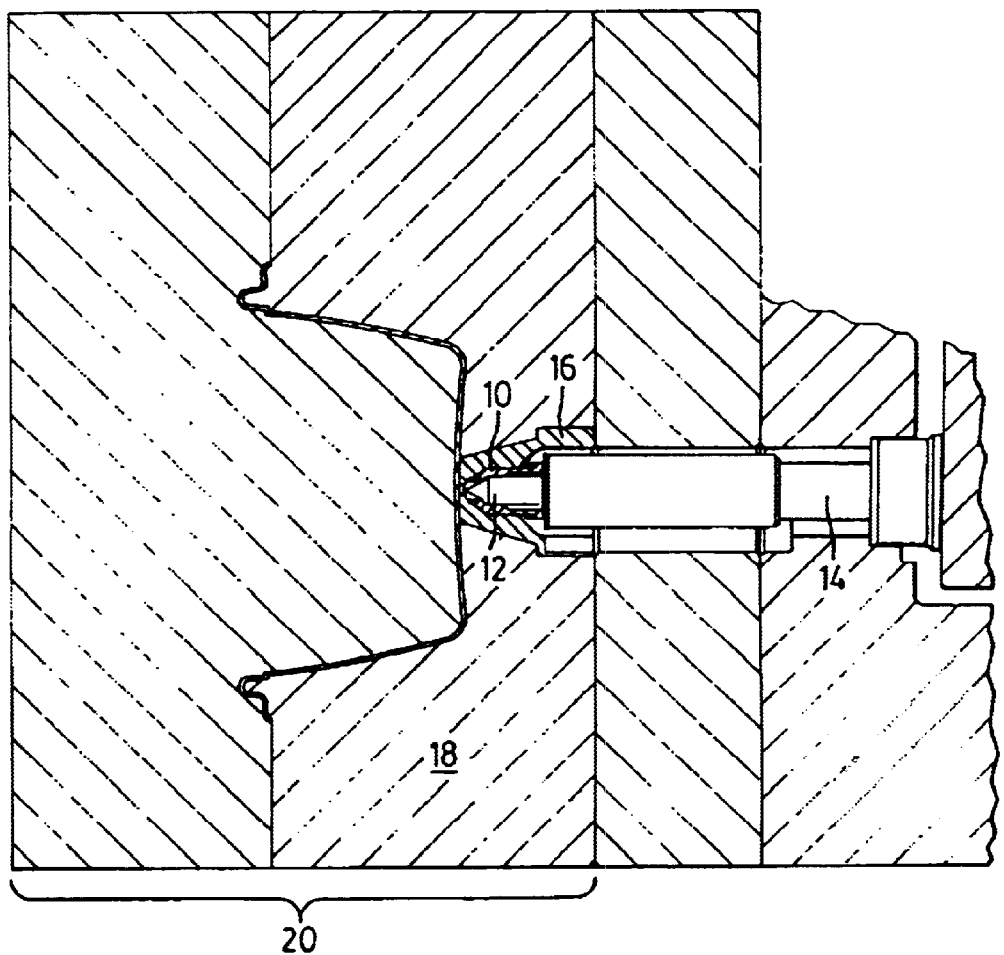
FIG. 1 is a schematic representation illustrating a nozzle cap according to the present invention in relation to other components of an injection moulding system.

A nozzle cap according to the present invention is generally indicated by reference 10 in the accompanying illustrations. The nozzle cap 10 secures an injection moulding nozzle tip 12 to a nozzle housing 14. The nozzle cap 10 extends into a gate insert 16 in a cavity part 18 of an injection mould 20.

The nozzle cap 10 has a body 30 which is mountable over the nozzle tip 12. The body has a housing end 32 with threads 34 for threadedly engaging the nozzle housing 14 to secure a base flange 22 of the nozzle tip 12 to the housing 14. The securement is by way of clamping the flange 22 between the housing end 32 and the housing 14. The base flange 22 is received within a recess 23 in the nozzle housing 14.

The body 30 has a tip end 36 extending about an outlet end 24 of the nozzle tip 12 and has a passage 38 registering with the outlet end 24 of the nozzle tip 12 to pass melt flow emerging from the nozzle tip 12.

The tip end 36 is dimensioned to provide a first clearance 40 between the outlet end 24 of the nozzle tip 12 and an interior 42 of the body 30. The first clearance is sufficient to avoid contact between the outlet end 24 of the nozzle tip 12 and the interior 42 to provide heat insulation while being small enough to substantially prevent melt flow therebetween. In practice it has been found that a clearance of 0.005 inches or less at operating temperatures provides suitable results.

The tip end 36 is further dimensioned to provide a second clearance 44 between the tip end 36 and the gate insert 18 which is both sufficient to provide heat insulation while substantially preventing melt flow between the tip end 36 and gate insert 18. In practice, it has been found that the second clearance may be less than 0.015 inches and preferably no greater than 0.010 inches. A smaller second clearance 44 may also produce suitable results however design clearances of less than 0.010 inches are hard to obtain and maintain in practice.

The body 30 further has a medial portion 46 between the tip end 36 and the housing end 32 which is dimensioned to sealingly contact the gate insert 18 as shown at reference 50.

In a preferred embodiment, an outer face of the nozzle cap 10 is provided with inter-engagement contours such as grooves 60 adjacent the tip end 36. In practice, the mould will periodically be disassembled for cleaning. As some resin may have seeped past the second clearance 44 to be trapped ahead of the medial portion 46 it is desirable to be able to remove this resin readily during mould cleaning. Upon solidification of the mould, the grooves 60 will engage the resin and act to urge the resin out of the gate insert than rather than remaining in the gate insert 18.

The nozzle cap 10 may be made of metal, such as H13 steel. Preferably the nozzle cap 10 will provided with a wear and corrosion resistant surface coating. A suitable coating may be provided by suitable surface treatment which may include chromium plating, nickel plating, ion nitriding and any other suitable treatment.

Figure 2:
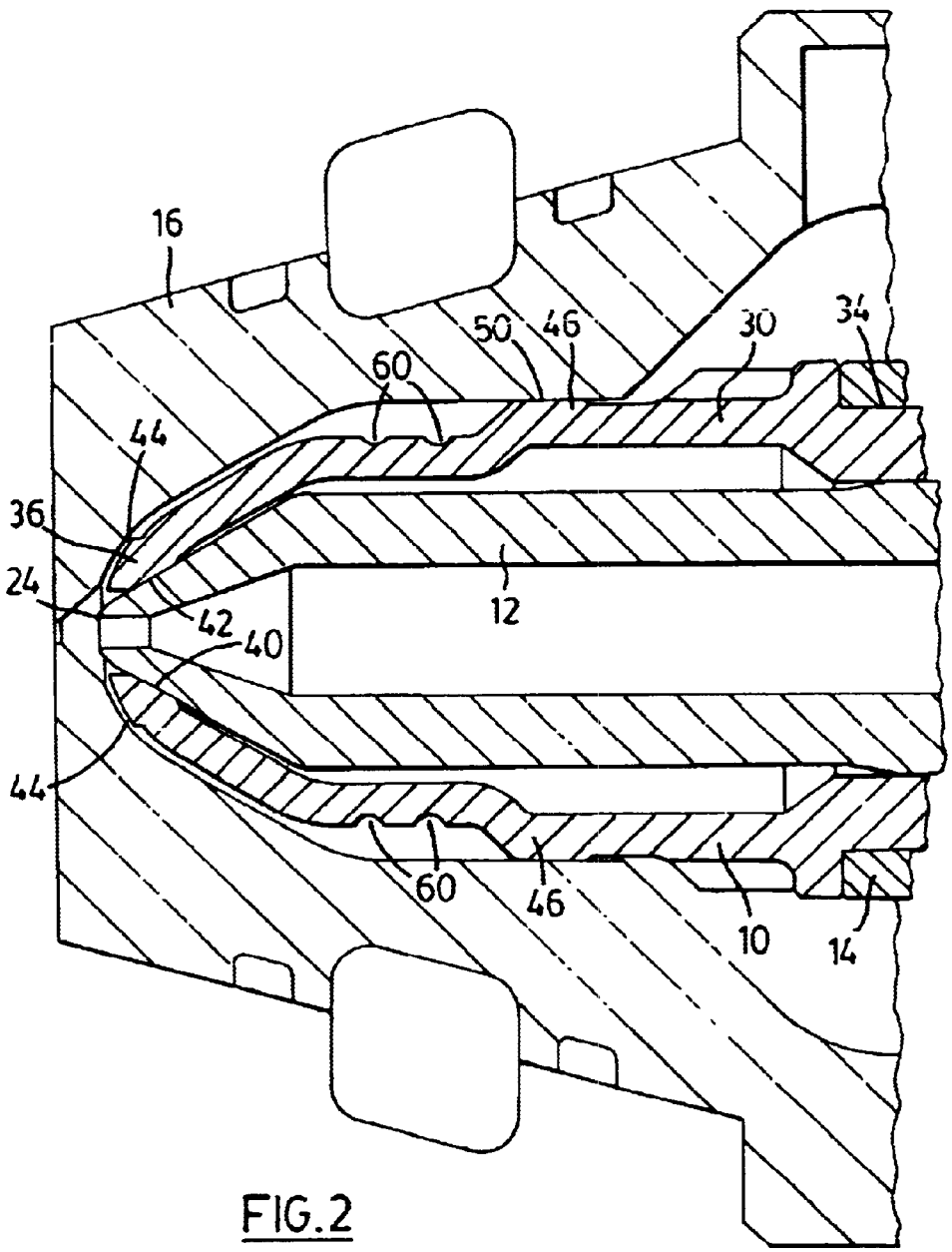
FIG. 2 is an axial section through a nozzle cap according to the present invention mounted over a first type of nozzle tip and within a gate insert.
Figure 3:
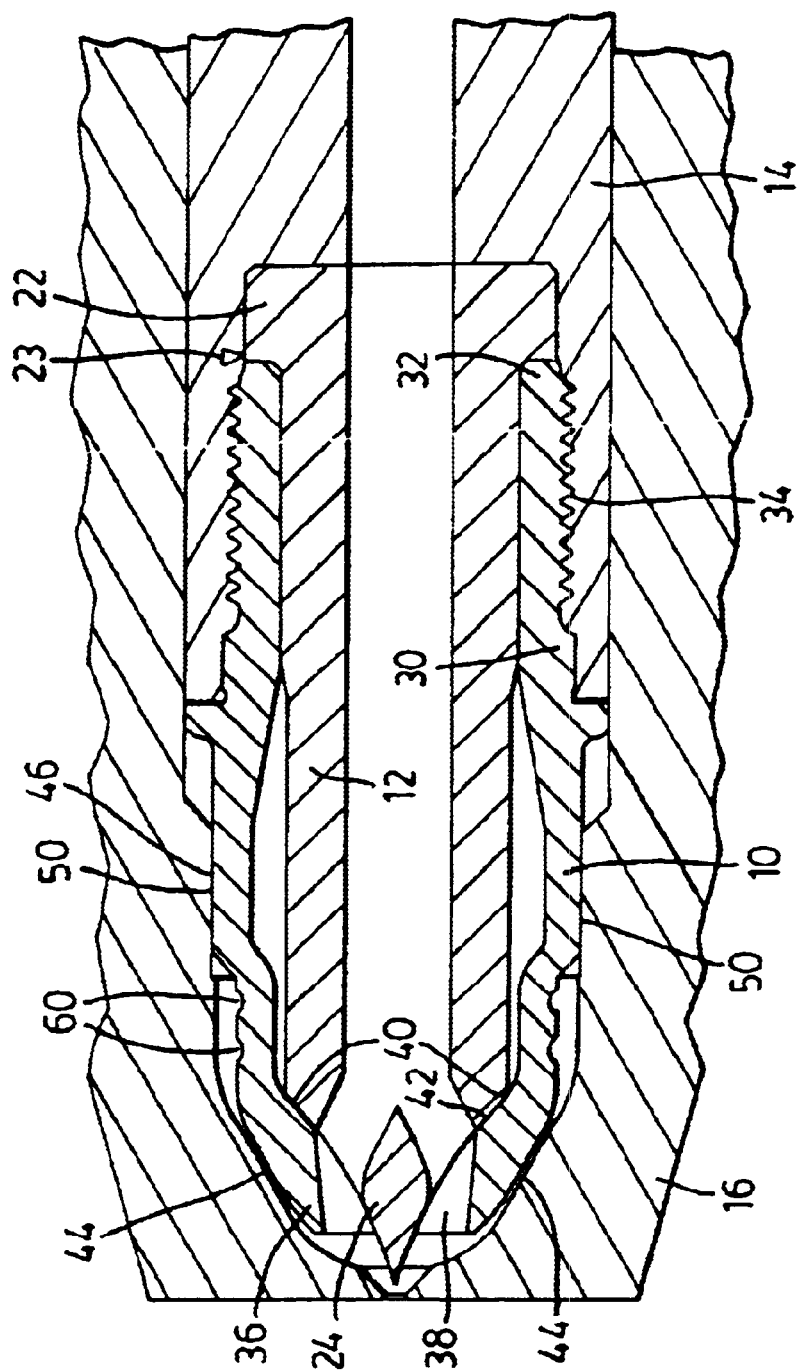
FIG. 3 is a view corresponding to FIG. 2 but illustrating the cap in use with a different type of nozzle tip; and, FIG. 4 is a perspective view illustrating a pair of nozzle caps according to the present invention.

FIG. 2 illustrates a nozzle cap 10 being used with a different type of nozzle tip 12. As the parts are generally the same as what is illustrated in FIG. 3, like components are indicated by like reference numerals and the above description applies. The principle difference between the nozzle tips 12 in the FIGS. 2 and 3 embodiments is that the FIG. 2 embodiment has a single outlet 28 such as might be used with a valve gated nozzle.

Figure 4:
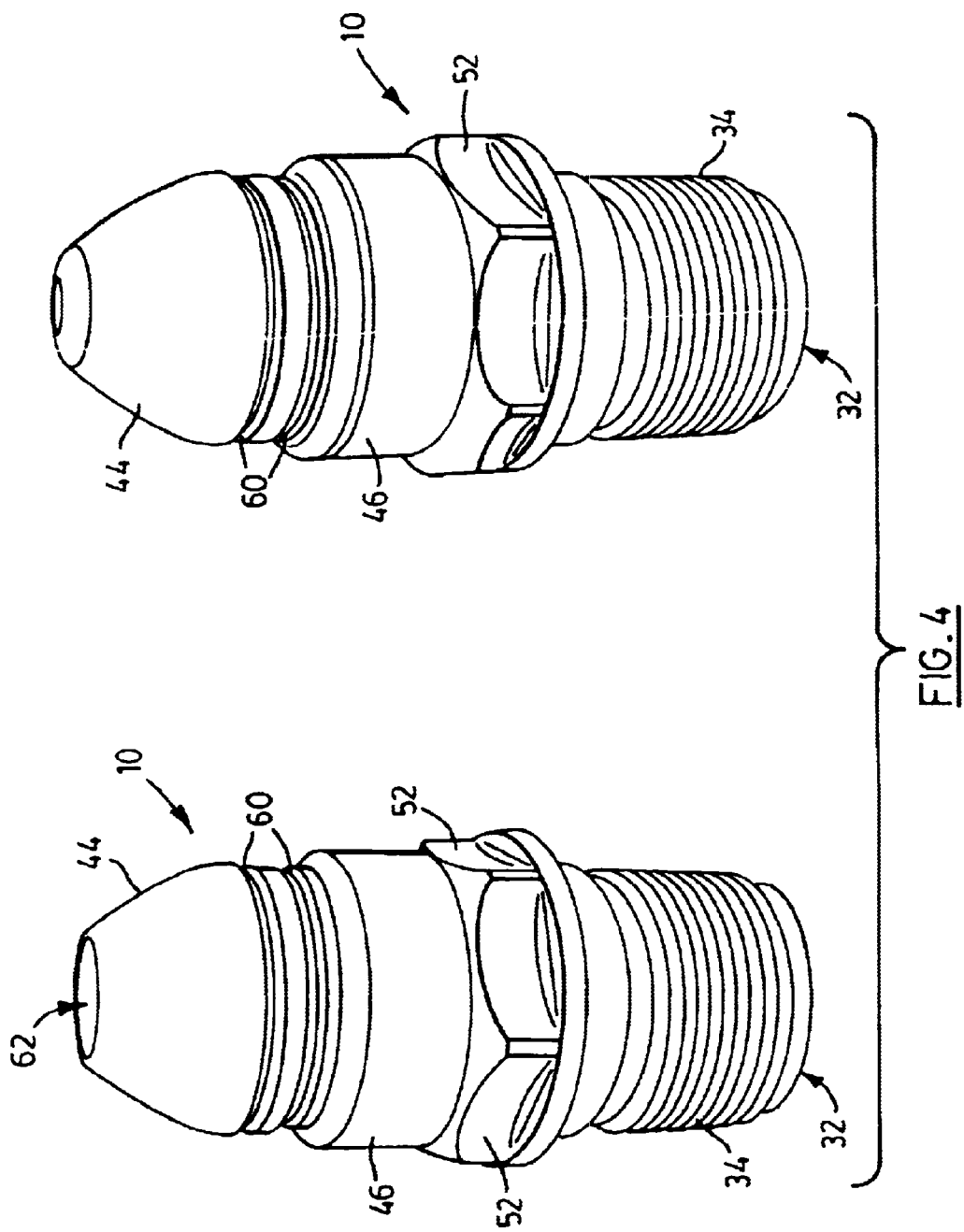

As illustrated in FIG. 4, the tip 10 may be provided with hexagonally disposed flats 52 to provide a gripping surface for a wrench or other installation tool.

The above description is intended in an illustrative rather than a restrictive sense. Variations to the exact embodiments described may be apparent to persons skilled in such structures without departing from the underlying invention which is defined by the claims set out below.

What is claimed is:

1. A nozzle cap (10) for securing an injection moulding nozzle tip (12) to a nozzle housing (4) and extending into a gate insert (16), said nozzle (10) cap comprising:

a body (30) mountable over said nozzle tip;

said body (30) having a housing end having a threaded portion for threadedly engaging said nozzle housing to secure a base flange (22) of said nozzle tip (12) to a recess (23) within said housing (14);

said body (30) having a tip end (36) extending about an outlet end (24) of said nozzle tip (12) and having a passage (38) registering with said outlet end (24) of said nozzle tip (12) to pass melt flow emerging from said nozzle tip (12);

said tip end (36) being dimensioned to provide a first clearance (40) between said outlet end (24) of said body (30) and said nozzle tip (12) sufficient to provide heat insulation while substantially preventing melt flow therebetween;

said tip end (36) further being dimensioned to provide a second clearance (44) between said tip end (36) and said gate insert (16) and said nozzle tip sufficient to provide heat insulation while substantially preventing melt flow therebetween;

said body (30) having a medial portion (46) between said tip end (36) and said housing end (32) which is dimensioned to sealingly contact said gate insert (18).

2. The nozzle cap (10) of claim 1 wherein:

an outer face of said nozzle cap (10) is provided with inter-engagement contours (60) adjacent said tip end (36) for engaging solidified resin between said nozzle cap (10) and said gate insert (18) to assist in holding said solidified resin to said nozzle cap (10) during separation of said nozzle cap (10) from said gate insert (18) during mould cleaning.

3. The nozzle cap (10) of claim 1 or 2 wherein:

said first clearance (40) is no greater than 0.005 inches; and, said second clearance (44) is no greater than 0.015 inches.

4. The nozzle cap (10) of claim 3 wherein:

said nozzle cap (10) is made of metal and has a wear resistant and corrosion resistant surface.

5. The nozzle cap (10) of claim 3 wherein:

said inter-engagement contours are grooves (60) extending into said outer face.

6. The nozzle cap (10) of claim 4 wherein:

said inter-engagement contours are grooves (60) extending into said outer face.

7. The nozzle cap (10) of claim 5 wherein:

said metal is H13 steel; and, said wear and corrosion resistant surface is provided by a surface treatment which is a member selected from the group consisting of chromium plating, nickel plating and ion nitriding.

8. The nozzle cap (10) of claim 7 wherein:

said first clearance (40) is 0.005 inches; and, said second clearance (44) is 0.010 inches.

9. A nozzle cap (10) for an injection moulding arrangement having a nozzle housing (14), a nozzle tip (12) with an inlet end opposite an outlet end (24) and a flange (22) extending about said inlet end and receivable in a recess (23) in said nozzle housing (14) and a gate insert (16) for receiving said nozzle tip (12) with a void space therebetween, said nozzle cap (10) comprising:

a body (30) with engagement means (34) at a housing end (32) thereof for engaging said nozzle housing (14) and capturing said flange (22) between said housing end (32) and said housing (14);

said body (30) extending over said nozzle tip (12) to substantially fill said void space without further contacting either said nozzle tip (12) or said gate insert (16) except along a medial portion (46) between said flange (22) and said outlet end (24) where said nozzle cap (10) sealingly contacts said gate insert (16);

said nozzle cap (10) having an outlet passage (62) providing fluid communication between said nozzle tip (12) and said gate insert (16); and, said nozzle cap (10) being close enough to said nozzle tip (12) and said nozzle gate insert (16) at said outlet end (24) of said nozzle tip (12) to substantially prohibit melt flow therebetween.

\* \* \* \* \*